United States Patent
Deluca et al.

(10) Patent No.: US 10,007,963 B2
(45) Date of Patent: Jun. 26, 2018

(54) CONTEXT-BASED PROVISION OF SCREENSHOT MODIFICATIONS

(71) Applicant: INTERNATIONAL BUSINESS MACHINES CORPORATION, Armonk, NY (US)

(72) Inventors: Lisa Seacat Deluca, Baltimore, MD (US); Shelbee D. Smith-Eigenbrode, Thornton, CO (US); Dana L. Price, Surf City, NC (US); Aaron J. Quirk, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 259 days.

(21) Appl. No.: 14/936,734

(22) Filed: Nov. 10, 2015

(65) Prior Publication Data

US 2017/0132742 A1   May 11, 2017

(51) Int. Cl.
*G06K 9/00* (2006.01)
*G06T 1/00* (2006.01)
*G06T 11/20* (2006.01)
*G06T 11/60* (2006.01)

(52) U.S. Cl.
CPC ............ *G06T 1/0021* (2013.01); *G06T 11/20* (2013.01); *G06T 11/60* (2013.01); *G06T 2207/20212* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 5,933,543 A | 8/1999 | Cok | |
| 8,060,795 B2* | 11/2011 | Bakekolo | G06F 11/079 714/57 |
| 8,429,745 B1 | 4/2013 | Casaburi et al. | |
| 8,694,884 B2* | 4/2014 | Dovey | G06F 9/4443 705/14.49 |
| 2009/0287962 A1* | 11/2009 | Bakekolo | G06F 11/079 714/38.14 |
| 2011/0312414 A1 | 12/2011 | O'Donnell | |
| 2012/0254778 A1* | 10/2012 | Svendsen | H04N 5/76 715/763 |

(Continued)

FOREIGN PATENT DOCUMENTS

| | | |
|---|---|---|
| CN | 104021350 A | 9/2014 |
| WO | 2012098539 A2 | 7/2012 |

*Primary Examiner* — Andrew Moyer
*Assistant Examiner* — Timothy Choi
(74) *Attorney, Agent, or Firm* — Maeve Carpenter; Matthew M. Hulihan; Heslin Rothenberg Farley & Mesiti PC

(57) ABSTRACT

Context-based provision of screenshot modification is provided herein. A screenshot image is obtained and analyzed to determine an acquisition context of the screenshot image, the acquisition context being a context in which the screenshot image was acquired. A display context in which the screenshot image is to be displayed is determined, and the screenshot image is prepared for display in the display context, the preparing including applying one or more modifications to one or more visual elements of the screenshot image based on the acquisition context and on the display context.

20 Claims, 5 Drawing Sheets

(56) References Cited

U.S. PATENT DOCUMENTS

2012/0297298 A1* 11/2012 Dovey .................. G06F 9/4443
  715/273
2013/0246039 A1 9/2013 Duneau
2016/0366126 A1* 12/2016 Sharifi .................. H04L 63/083

* cited by examiner

CONTEXT-BASED PROVISION OF SCREENSHOT MODIFICATIONS

BACKGROUND

Taking a screen capture is a common way to quickly save a piece of information displayed on the screen for future reference or to share with another person. Most mobile devices have a key sequence (such as to simultaneously press and hold the home and power buttons for 2 seconds) that causes a screen capture to occur. The screen capture action saves as an image file whatever is on the device's screen at the point of capture. The saved image file may be handled (e.g. viewed or shared) as would be any other image file, such as one taken with the device's camera. Problems may arise, however, when displaying that screenshot at a later time.

SUMMARY

Shortcomings of the prior art are overcome and additional advantages are provided through the provision of a computer-implemented method that includes obtaining a screenshot image, analyzing the screenshot image to determine an acquisition context of the screenshot image, the acquisition context being a context in which the screenshot image was acquired, determining a display context in which the screenshot image is to be displayed, and preparing the screenshot image for display in the display context, the preparing including applying one or more modifications to one or more visual elements of the screenshot image based on the acquisition context and on the display context.

Further, a computer program product including a computer readable storage medium readable by a processor and storing instructions for execution by the processor is provided for performing a method that includes: obtaining a screenshot image, analyzing the screenshot image to determine an acquisition context of the screenshot image, the acquisition context being a context in which the screenshot image was acquired, determining a display context in which the screenshot image is to be displayed, and preparing the screenshot image for display in the display context, the preparing including applying one or more modifications to one or more visual elements of the screenshot image based on the acquisition context and on the display context.

Yet further, a computer system is provided that includes a memory and a processor in communications with the memory, wherein the computer system is configured to perform a method including: obtaining a screenshot image, analyzing the screenshot image to determine an acquisition context of the screenshot image, the acquisition context being a context in which the screenshot image was acquired, determining a display context in which the screenshot image is to be displayed, and preparing the screenshot image for display in the display context, the preparing including applying one or more modifications to one or more visual elements of the screenshot image based on the acquisition context and on the display context.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

The terms "screenshot", "screenshot image", "screen capture", and "screen capture image" are used interchangeably herein, and refer to an acquired image of what is displayed on a display of a device. A typical example of acquiring a screen capture is the device itself (i.e. a device having the screen on which the picture elements being captured appear) captures the image based on a key combination or other command provided to the device. This scenario is used in the description of specific examples provided herein, however aspects described herein may involve screenshots acquired by a device other than the one having the display, such as the case where a camera takes a picture of the display of a (separate) device, thereby acquiring a screenshot of the display of the separate device.

A screen capture image may contain features, such as a navigation bar, notifications icons, a clock, soft control features such as buttons, and so forth, that the user may or may desire to be retained or displayed when displaying the captured image. These additional features can present problems for the user. For instance, the user may not want to share this information when sharing the screenshot with others for fear that it could potentially leak personal data (e.g. app notification icons, clock state at the time of the capture, etc.).

Figure 1:
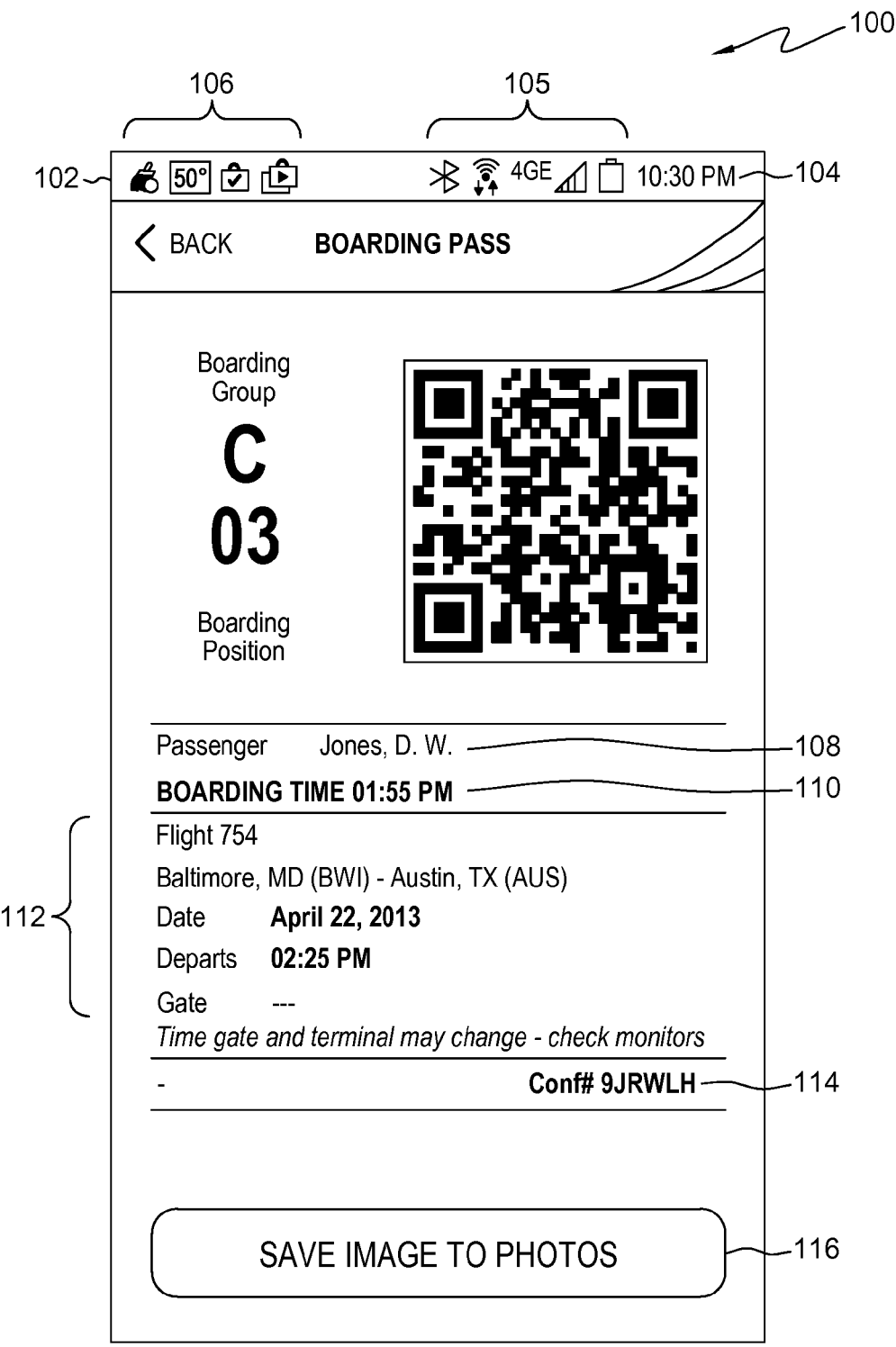
FIG. 1 depicts an example of a screenshot image.

FIG. 1 depicts an example of a screenshot 100 from a mobile device with a boarding pass application ("app") offered to airline customers displayed. Screenshot 100 includes a depiction of a notification bar 102 with features showing a clock 104 displaying a time at which the image was taken (10:30 PM), as well as status icons 105 and four other notifications 106, including a weather notification. Furthermore, the in-focus app displays passenger name 108, boarding time 110, flight information 112, and confirmation code 114, all of which are features of screenshot 100 that the user may regard as being sensitive information. The application also features a Save Image to Photos soft control button 116.

Thus, screenshots can include information that is sensitive. Moreover, screenshots may include features that can lead to confusion in users who view the screenshot, especially on devices that are similar in terms of their user interface. When viewing this screenshot on a viewing device, especially in full-screen mode as is common in image gallery viewers on mobile devices, it can be confusing for the viewing user to view the screenshot on a same (or similar) device as the one from which the screen capture was acquired. This is because the user may attempt to interact with image elements that the user mistakenly believes are active elements provided by the operating system (or other software) of the viewing device. For instance, if the screenshot includes a portion displaying a soft "Home" button, the viewing user may attempt to click this button in the image out of habit expecting that doing so will take the user back to the Home screen of the viewing device. This, of course, will not happen because the Home button is just an image representation of the Home button of the acquiring device.

It is possible to edit a screen capture image by opening an editor and manually editing the image, but this approach is cumbersome. The user would open the image in an editor, make the modifications, save a copy of the image, find the new image, then complete whatever the desired action is, such as sending it to a friend or posting it to social media.

More useful would be an integrated approach to screen capture modification and sharing as described herein that programmatically considers context in the modification of image content and automatically applies the desired modifications. The context may account for attributes such as relationship with target user or device type of target user, as examples. Aspects described herein therefore apply context to the decisions about removing or modifying elements in the screenshot. The viewing (i.e. display) context may inform which aspects and content of the screenshot are be removed or modified, enabling the viewer, sender, and/or recipient of a screenshot to control the modifications to be applied.

Accordingly, aspects described herein enable dynamic modifications to a screen capture image according to context of the image, context referring to the context in which it was acquired, context in which it is displayed, or a combination of the two. Examples of such dynamic modification include, but are not limited to:

Modifying control surfaces displayed in a screen capture image, for instance when viewed on a same or similar type of device or form factor. Control surfaces include, as examples, interactive interface elements, such as soft buttons, that provide for user control. These are typically not part of what the user(s) would regard as being the relevant portions of the view, and instead appear as part of the operating system or app environment. An example is an overlaid soft 'back' button in an internet browser of a mobile device. Another example is the "Save Image to Photos" button 116 in FIG. 1, the intent of which is for the user (of the app itself) to click the button to save the image to the photos collection. The button may have no relevance to an image that happens to show the button;

Modifying notification(s) appearing in a screen capture image, for instance when the image is shared external to the device;

Modifying state data (clock, alarms, text, etc.) appearing in a screen capture image, for instance when the image is shared external to the device;

Modifying personal/sensitive data appearing in a screen capture image, for instance when the image is shared external to the device. The types of data to modify may be predefined/configured by the user.

A modification can include any combination of removing, obscuring, altering, replacing, and/or augmenting a visual element. It includes, as examples, blurring, applying different colors, highlighting, and/or watermarking the element.

Accordingly, a screen capture image may be dynamically modified depending on how the image is being used at a given time. When the screen capture image is modified, the original image may, if desired, remain intact on the device performing the modification, so the image can be modified at different times in different ways depending on the different contexts in which it may be displayed. A modified version of the screen capture image can be displayed and/or shared according to different contextual scenarios.

Software to perform aspects described herein may be built into the operating system(s) of the capturing/viewing device(s) and/or hook into the operating system(s) and become part of the screen capture or image display options. A facility for providing modifications to a screenshot may exist on a capturing device, a viewing device (in which the viewing device applies the modification to a received screenshot), or both devices.

Some examples that may be used as criteria for dynamic modification include (but are not limited to):

Operating system (OS) and/or OS version of the source (acquiring) device compared to operating system/version of the target (displaying) device;

Overlap in similar interface elements (gleaned from image analysis and/or display theme settings on the source device compared to those of the display device);

Relationship between the source device user and the target device user;

User request for dynamic modification;

Presence of notifications or other sensitive information.

If a usage scenario is detected that dictates dynamic modification, the image will be modified. The modifications may include (but are not limited to):

Modifying interactive control surfaces, such as soft control buttons (e.g. back, home, app drawer, etc.);

Modifying menus;

Modifying notification icons such as for battery strength, signal strength, WiFi, Bluetooth status, application information, carrier information, application-specific notifications, as examples;

Modifying date/time information;

Modifying personal information (user identifiers, login data, etc.);

Modifying (through addition) a tag/indicator that the image is a snapshot, to avoid viewers of the screenshot mistakenly regarding the image as being a live view.

Modification can include replacement with other information. The other information may be updated (for instance real-time) information. For instance, the modification may be to replace an indication in the screenshot of the time (e.g. 104 in FIG. 1, which indicates 10:30 PM) with the current system time of the viewing device at the time the screenshot is being viewed. This may be a useful convenience in the event that a user captures a screenshot for the user to view later. For instance, the user may take screenshot 100 of FIG. 1 and close out of the boarding pass application before going through a security check. Instead of the user having to open the boarding pass application each time to view the information presented for the boarding pass, the user could view the screenshot in the user's photo gallery. However, absent modification to the screenshot, the user viewing the screenshot in full-screen may mistakenly believe the current time to be 10:30 PM. In reality, the current time when viewing the screenshot will be later than 10:30 PM, which can cause problems if the user relies on the information in the (unmodified) screenshot. The user may miss early boarding of the user's flight, for instance.

Aspects described herein may be implemented on either the acquiring (i.e. capturing) device, the display device, or both, in some examples. In one embodiment, the acquiring device dynamically modifies a screenshot image according to aspects described herein prior to sending/sharing to another user. The receiving (displaying) device will receive only the modified version of the image and therefore need not include facilities described herein for modifying a screenshot image. The sending (acquiring) device can retain the original version of the image and optionally the modified version as well. In another embodiment, the sending device, which may or may not have facilities for modifying a screenshot image as described herein, sends the original version of the screen capture image to a display device and the receiving display device determines that the image is to be dynamically modified, modifies the screenshot image accordingly, and displays the modified version of the image to the target user. Either scenario can provide the same benefits of protecting sensitive information and preventing the screenshot from appearing as though it is the true interface of the receiving device.

Figure 2:
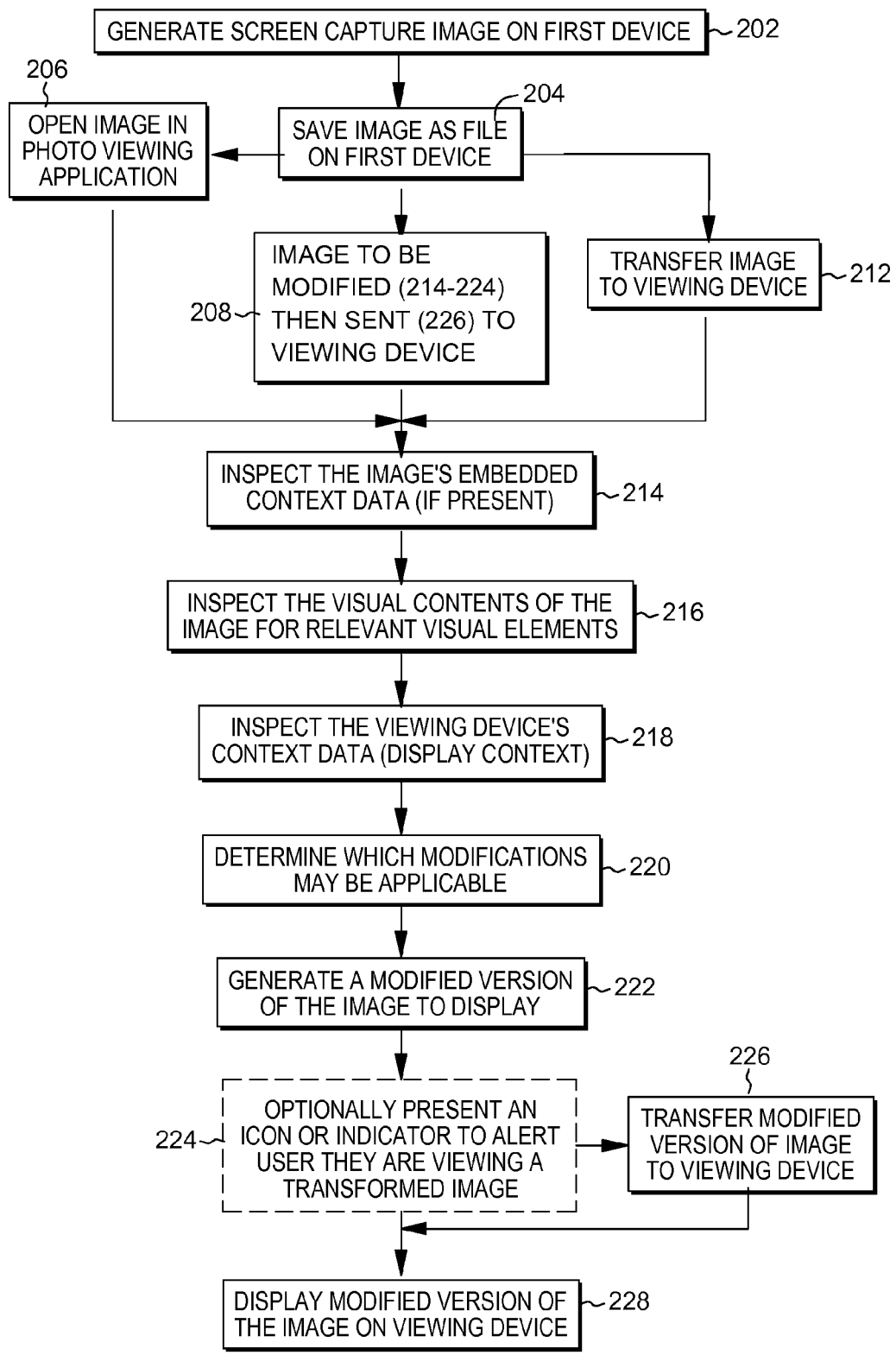
FIG. 2 depicts an example process for modifying a screenshot image and displaying the modified version of the screenshot image, in accordance with aspects described herein.

FIG. 2 depicts an example process for modifying and displaying a screenshot, in accordance with aspects described herein. Initially, a screen capture image is generated on a first device (202), also referred to as the acquiring device because it acquires the screen capture image. This may be based on a first user making a selection to take a screenshot, for instance using a key/button combination as one example. Next, the image is saved as an image file on the first device (204). Metadata may be stored with the image, for instance embedded in the image file (like EXIF data is in photos). Many aspects of the acquisition context— that is, the context under which the image is captured—may be saved with the image. The acquisition context can include device information, state information, information about the user, application data, and/or any other information informing of the context under which the screenshot was taken. Example acquisition context data includes indications of device type, model type of the device, location, time, user profile, as examples. Some or all of the acquisition context data is pulled from the operating system (for instance via system calls), by screen scraping), and/or obtained via sensors, for instance location information by a global positioning system sensor.

Continuing with FIG. 2, there are three different scenarios presented in this example for modifying and viewing the screenshot. The first scenario is that the first user of the first device wishes to view the image on the first device, for instance by opening the image in a photo viewing application (206) to trigger the modification and display of the modified screenshot image (214-228). In this situation, the acquiring device and display device are the same device, though the acquisition context and display context may differ (for instance the time of acquisition may differ from the time of display, or the user using the device may different when displaying the screenshot, as examples.

The second scenario (208) is that the user of the first device wishes to modify (214-224) and then share (226) the screenshot with a second ("viewing" or "target") device, taking into account a relationship between the first user and a target user. Regarding the relationship, device type of the recipient device may be stored in a user contact for the recipient to enable better decisions about whether to modify images being sent to that recipient. Relationship with a recipient user can determine how much context information to share. If the recipient is the first user's spouse, for instance, then it may be acceptable to share more sensitive information than would be shared with a co-worker for example. The acquisition and display context can therefore encompass the relationship between the first user and the recipient user, for considerations about the appropriateness and sensitivity of visual elements, such as whether the recipient user is able to view current application notifications, current location, installed applications, text in the screenshot image indicating contacts, etc.

The third scenario is that the user of the first device wishes to share the screenshot with a second ("viewing" or "target") device, which is then to modify the screenshot prior to its display, in which case the image is initially transferred to the viewing device (212) for modification and display (214-228). This may be the case when the acquiring device does not include facilities described herein for modifying a screenshot image, but the displaying devices has facilities described herein for displaying a modified image.

Regardless of the above scenario, the process proceeds to the modification stage (214-224) performed by either (i) the acquiring device if the screenshot is to be viewed locally (206) or is to be modified then shared with another device (208) or (ii) the receiving device if the screenshot was shared from the acquiring device and is to be modified by the receiving device prior to display (210). The screenshot is opened, for instance directly from a screenshot notification, via a photo gallery application, inside an MMS viewer as an embedded image, or inside an email viewer as an embedded image, as examples. The viewing system/application inspects the image's embedded context data (assuming that the context data is present) (214). The viewing system/application also inspects the visual contents of the image (216) for relevant visual elements. The visual contents refers to the bitmap/pixel data. With respect to (214) and (216), the acquisition context data in one embodiment is saved with the screenshot image for easy lookup, as in 214. Additionally or alternatively, the context data is not embedded in the image metadata but is harvested by analyzing the image data itself. For example, a time of capture may not be stored as metadata but image analysis can detect that a clock pictured in the corner of the screenshot reads 10:30 PM, indicating the time of capture. As another example, the operating system version may not be embedded in the metadata but the arrangement and appearance of notification bar icons and soft buttons may indicate the particular operating system of the acquiring device. Thus, the inspection of the visual contents can identify not only where the particular visual elements for (potential) modification exist, but also additional acquisition context of the image. The inspection of the visual contents of the image can identify features described above, such as control surfaces, notifications, and so on.

The process of FIG. 2 continues by inspecting the viewing device's context data (218), referred to herein as the display context data. In the first scenario above, the viewing device is also the acquiring device. The display context refers to the context under which the image is displayed, including the information about the viewing device. Display context can include the current user (of the display device), current operating system version, current display or interface settings and features, image viewing size (small sub-window vs. full screen), and any other indication about the context in which the screenshot is being viewed. Thus, it considers the viewer's interface and how identical or similar it is to the sender's interface (buttons, colors, etc.). As a specific example, the sender might send the screenshot to several people and may want to obscure the Back button only for those viewers viewing the screenshot using an operating system that ordinarily puts a similar Back button in/around the location of the Back button in the image.

The viewing system/application then determines which types of modifications described above may be applicable (220). It does so by comparing the acquisition context and the display context. Thresholds may be used to inform of whether modifications are to be made. Although the acquisition context and display context may not involve the exact same operating system, similar or close OS revisions, indications of the same manufacturer but different model device, or other factors may dictate that a modification be made to visual elements of the screenshot.

The viewing system/application then generates a modified version of the image to display (222), and may optionally augment the image with an icon or indicator to alert the viewing user that the displayed image is a modified version of a screenshot (224), if the user is authorized or if the user has specified such a preference.

In the event of the second scenario, where the image is being modified by the acquiring device prior to transferring to a target device, the process of FIG. 2 continues by transferring the modified version of the image to the viewing device (226). Then, or in the case of the first and third scenarios where the image was modified on the device display, the modified version of the image is displayed on the viewing device (228) and the process ends.

Described herein are facilities for modifying screenshot images for security, convenience, and other purposes. This improves user experience on mobile and other devices, promotes increased sharing of data between users, reduces user mistakes occurring from incorrectly interpreting the screen shot acquisition context, reduces effort and time when sharing screen captures, and provides the ability to safely and securely share screen captures without including specific sensitive information as specified by the users or policies.

Figure 3:
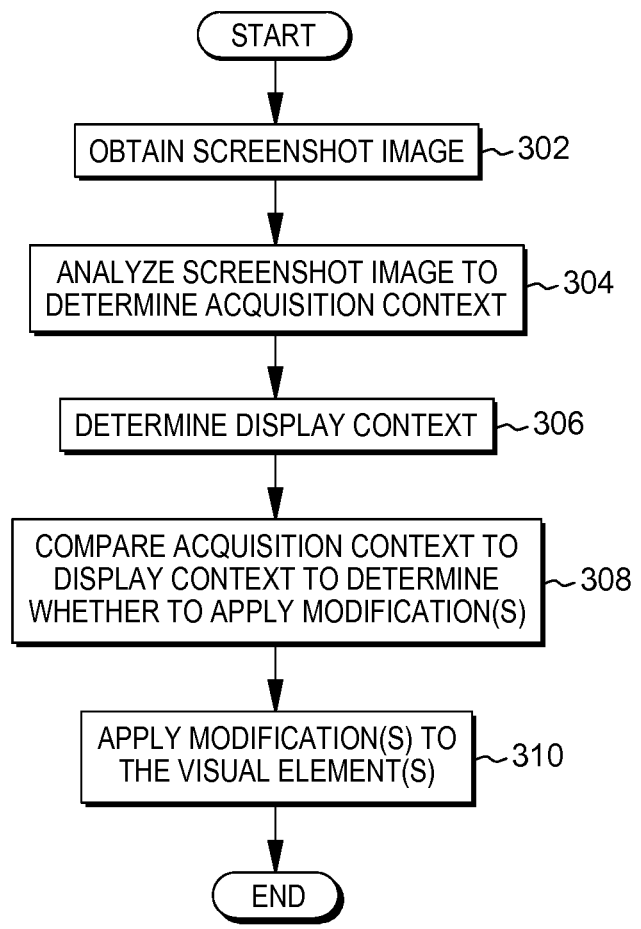
FIG. 3 depicts an example process for providing a screenshot image for display, in accordance with aspects described herein.

Accordingly, processes for providing a screenshot image for display in accordance with aspects described herein are provided, an example such process is now described and depicted with reference to FIG. 3. The process begins by obtaining a screenshot image (302). The device obtaining the screenshot image may be the acquiring device (a device that captures the image of the screen, such as the computer system to which the screen is attached), or may be a receiving device that receives the image from an acquiring device. Next, the screenshot image is analyzed to determine an acquisition context of the screenshot image (304), the acquisition context being a context in which the screenshot image was acquired. In some examples, the screenshot image includes embedded acquisition context data, and the analyzing the screenshot image determines the acquisition context based, at least partially, on the embedded acquisition context data of the screenshot image. In this regard, an acquiring device could perform, when capturing the image, gathering the acquisition context data at a time that the acquiring computer system acquires the screenshot image, and embedding the acquisition context data as metadata of the screenshot image. Additionally or alternatively, analyzing the screenshot image can include analyzing pixel data of the screenshot image to ascertain visual elements presented in the screenshot image, where the acquisition context is determined based at least partially on the ascertained visual elements presented in the screenshot image.

The process continues by determining a display context in which the screenshot image is to be displayed (306). The device considering the display context then prepares the screenshot image for display in the display context. This can include determining, based on the acquisition context and on the display context, whether one or more modifications (i.e. to one or more visual elements of the screenshot image) are to be applied to the image. This can be based on a comparison of the acquisition context to the display context (308). In an example where the acquiring device is also the displaying device, or where the acquiring device is preparing the screenshot for sharing with, and display on, a target device, the acquiring device considers the context in which the image is to be displayed and may provide some or all of the necessary modifications. It may, for instance, obscure sensitive text in the screenshot prior to displaying/sharing. In an example where the acquiring device lacks the facilities to modify the screenshot image according to aspects described herein but a receiving device include such facilities, the display context is considered by the receiving device.

In some embodiments, whether the one or more modifications are to be applied is based at least in part on comparison of the acquisition context to the display context, in which the comparison includes a comparison of an operating system, as determined from the acquisition context, of the capturing computer system that captures the screenshot image to an operating system, as determined from the display context, of a display computer system to display the screenshot image with the one or more modifications. Additionally or alternatively, whether the one or more modifications are to be applied is based at least in part on comparison of the acquisition context to the display context, in which the comparison includes a comparison of user interface elements of the capturing computer system, as determined from the acquisition context, to user interface elements of the display computer system, as determined from the display context, wherein the greater the likeness between user interface elements of the capturing computer system and user interface elements of the display computer system, the more likely it is that the one or more modifications are to be applied. This may be to avoid confusion in viewing users who might interpret visual elements of the screenshot to be active elements of the user's own interface, as an example.

Whether the one or more modifications are to be applied may additionally or alternatively be based at least in part on a relationship of a user indicated by the acquisition context to a user indicated by the display context, and/or based on a user request for the one of more visual elements to be modified given the display context.

When the modification(s) to apply are determined, the process applies the one or more modifications to one or more visual elements of the screenshot image (310) based on the acquisition context and on the display context. The one or more modifications can include removing, obscuring, altering, replacing, and/or augmenting one or more visual elements of the image. For instance, the at least one visual element can include one or more of: interactive elements providing user control, navigation menus, notifications or notification icons, state data of a capturing computer system that captures the screenshot image, or sensitive data, as examples.

The above-described preparing of the screenshot image for display may be performed by a first computer system (such as an acquiring computer system), which can be followed by the first computer system providing the screenshot image with the one or more modifications applied thereto to a second computer system for display. This may be repeated for multiple different recipient computer systems, providing a respective set of modifications to the image depending on the respective display context for each recipient computer system.

Processes described herein may be performed by one or more computer systems. In some examples, such a computer system that performs process(es) described herein is a computer system that is part of, includes, or uses a flexible display or apparatus into which the flexible display is incorporated. In other examples, a remote computer system in communication with such computer system performs process(es) described herein. As a third possibility, a combination of the (i) computer system including/using the flexible display and (ii) remote computing system(s) perform process(es) described herein.

Figure 4:
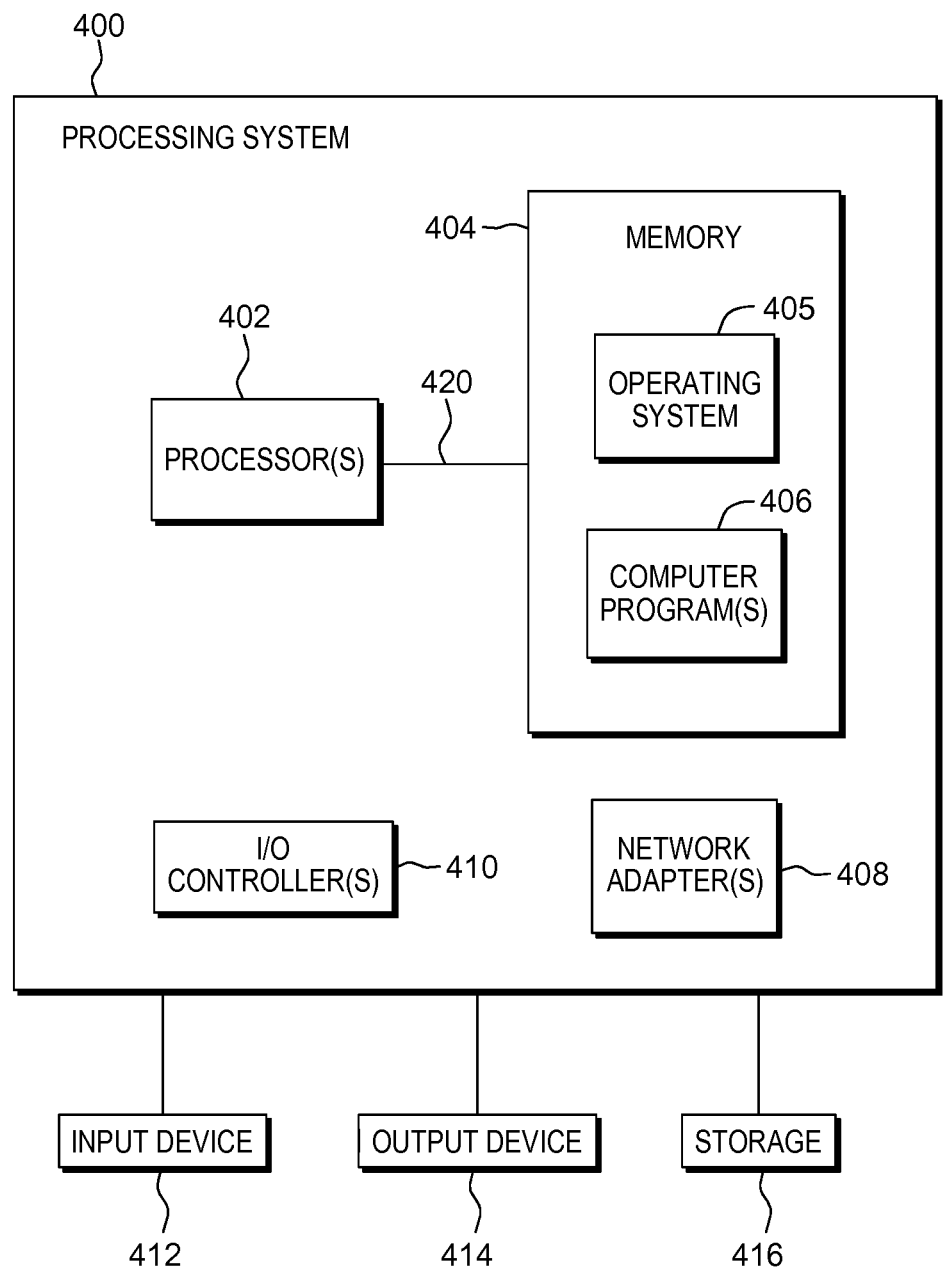
FIG. 4 depicts one example of a computer system to incorporate and use aspects described herein.

FIG. 4 depicts one example of a computer system to incorporate and use aspects described herein. A computer system may also be referred to herein as a processing device/system or computing device/system, or simply a computer. Computer system 400 may be based on various system architectures such as those offered by International Business Machines Corporation (Armonk, N.Y., USA), Intel Corporation (Santa Clara, Calif., USA), or ARM Holdings plc (Cambridge, England, United Kingdom), as examples.

Computer system 400 is suitable for storing and/or executing program code and includes at least one processor 402 coupled directly or indirectly to memory 404 through, e.g., a system bus 420. In operation, processor(s) 402 obtain from memory 404 one or more instructions for execution by the processors. Memory 404 may include local memory employed during actual execution of the program code, bulk storage, and cache memories which provide temporary storage of at least some program code in order to reduce the number of times code must be retrieved from bulk storage during program code execution. A non-limiting list of examples of memory 404 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 404 includes an operating system 405 and one or more computer programs 406, for instance programs to perform aspects described herein.

Input/Output (I/O) devices 412, 414 (including but not limited to displays, such as flexible touchscreen displays, microphones, speakers, accelerometers, gyroscopes, magnetometers, light sensors, proximity sensors, GPS devices, cameras, etc.) may be coupled to the system either directly or through I/O controllers 410.

Network adapters 408 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 408 used in computer system.

Computer system 400 may be coupled to storage 416 (e.g., a non-volatile storage area, such as magnetic disk drives, optical disk drives, a tape drive, etc.), having one or more databases. Storage 416 may include an internal storage device or an attached or network accessible storage. Computer programs in storage 416 may be loaded into memory 404 and executed by a processor 402 in a manner known in the art.

The computer system 400 may include fewer components than illustrated, additional components not illustrated herein, or some combination of the components illustrated and additional components. Computer system 400 may include any computing device known in the art, such as a mainframe, server, personal computer, workstation, laptop, handheld or mobile computer, tablet, wearable device, telephony device, network appliance, virtualization device, storage controller, etc.

Figure 5:
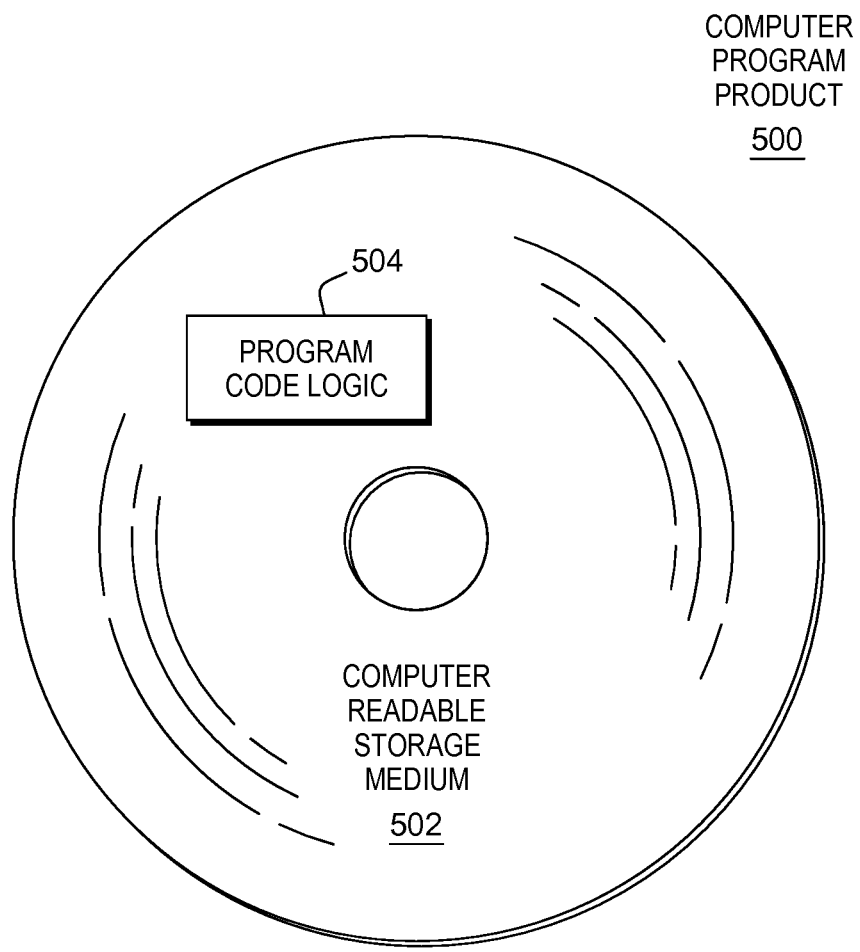
FIG. 5 depicts one embodiment of a computer program product.

Referring to FIG. 5, in one example, a computer program product 500 includes, for instance, one or more computer readable storage media 502 to store computer readable program code means, logic and/or instructions 504 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   obtaining a screenshot image;
   analyzing the screenshot image to determine an acquisition context of the screenshot image, the acquisition context being a context in which the screenshot image was acquired;
   determining a display context in which the screenshot image is to be displayed; and
   preparing the screenshot image for display in the display context, the preparing comprising applying one or more modifications to one or more visual elements of the screenshot image based on the acquisition context and on the display context, and the preparing the screenshot image for display further comprising determining, based on the acquisition context and on the display context, whether the one or more modifications are to be applied to the image, wherein whether the one or more modifications are to be applied is based at least in part on a comparison of the acquisition context to the display context, the comparison comprising a comparison of an operating system, as determined from the acquisition context, of a capturing computer system that captures the screenshot image to an operating system, as determined from the display context, of a display computer system to display the screenshot image with the one or more modifications.

2. The method of claim 1, wherein the screenshot image comprises embedded acquisition context data, and wherein the analyzing the screenshot image determines the acquisition context based at least partially on the embedded acquisition context data of the screenshot image.

3. The method of claim 2, further comprising gathering the acquisition context data by a capturing computer system at a time that the capturing computer system captures the screenshot image, and embedding the acquisition context data as metadata of the screenshot image.

4. The method of claim 1, wherein the analyzing the screenshot image comprises analyzing pixel data of the screenshot image to ascertain visual elements presented in the screenshot image, wherein the acquisition context is determined based at least partially on the ascertained visual elements presented in the screenshot image.

5. The method of claim 1, wherein whether the one or more modifications are to be applied is based at least in part on a comparison of user interface elements of the capturing computer system, as determined from the acquisition context, to user interface elements of the display computer system, as determined from the display context, wherein likelihood that the one or more modifications are to be applied is directly proportional to a degree of likeness between user interface elements of the capturing computer system and user interface elements of the display computer system.

6. The method of claim 1, wherein whether the one or more modifications are to be applied is based at least in part on a relationship of a user indicated by the acquisition context to a user indicated by the display context.

7. The method of claim 1, wherein whether the one or more modifications are to be applied is based at least in part on a user request for the one of more visual elements to be modified given the display context.

8. The method of claim 1, wherein at least one modification of the one or more modifications comprises removing, obscuring, replacing, or augmenting at least one visual element of the one or more visual elements.

9. The method of claim 8, wherein the at least one visual element comprises one or more of: interactive elements providing user control, navigation menus, notifications or notification icons, state data of a capturing computer system that captures the screenshot image, or sensitive data.

10. The method of claim 1, wherein the preparing is performed by a first computer system and wherein the method further comprises providing the screenshot image with the one or more modifications applied thereto to a second computer system for display.

11. A computer program product comprising:
a computer readable storage medium readable by a processing circuit and storing instructions for execution by the processing circuit for performing a method comprising:
obtaining a screenshot image;
analyzing the screenshot image to determine an acquisition context of the screenshot image, the acquisition context being a context in which the screenshot image was acquired;
determining a display context in which the screenshot image is to be displayed; and
preparing the screenshot image for display in the display context, the preparing comprising applying one or more modifications to one or more visual elements of the screenshot image based on the acquisition context and on the display context, and the preparing the screenshot image for display further comprising determining, based on the acquisition context and on the display context, whether the one or more modifications are to be applied to the image, wherein whether the one or more modifications are to be applied is based at least in part on a comparison of the acquisition context to the display context, the comparison comprising a comparison of an operating system, as determined from the acquisition context, of a capturing computer system that captures the screenshot image to an operating system, as determined from the display context, of a display computer system to display the screenshot image with the one or more modifications.

12. The computer program product of claim 11, wherein the screenshot image comprises embedded acquisition context data, wherein the method further comprises gathering the acquisition context data by a capturing computer system at a time that the capturing computer system captures the screenshot image and embedding the acquisition context data as metadata of the screenshot image, and wherein the analyzing the screenshot image determines the acquisition context based at least partially on the embedded acquisition context data of the screenshot image.

13. The computer program product of claim 11, wherein whether the one or more modifications are to be applied is based at least in part on at least one selected from the group consisting of:
a comparison of user interface elements of the capturing computer system, as determined from the acquisition context, to user interface elements of the display computer system, as determined from the display context, wherein the likelihood that the one or more modifications are to be applied is directly proportional to a degree of likeness between user interface elements of the capturing computer system and user interface elements of the display computer system;
a relationship of a user indicated by the acquisition context to a user indicated by the display context; and
a user request for the one of more visual elements to be modified given the display context.

14. The computer program product of claim 11, wherein at least one modification of the one or more modifications comprises removing, obscuring, replacing, or augmenting at least one visual element of the one or more visual elements.

15. The computer program product of claim 14, wherein the at least one visual element comprises one or more of: interactive elements providing user control, navigation menus, notifications or notification icons, state data of a capturing computer system that captures the screenshot image, or sensitive data.

16. A computer system comprising:
a memory; and
a processor in communication with the memory, wherein the computer system is configured to perform a method, the method comprising:
obtaining a screenshot image;
analyzing the screenshot image to determine an acquisition context of the screenshot image, the acquisition context being a context in which the screenshot image was acquired;
determining a display context in which the screenshot image is to be displayed; and
preparing the screenshot image for display in the display context, the preparing comprising applying one or more modifications to one or more visual elements of the screenshot image based on the acquisition context and on the display context, and the preparing the screenshot image for display further comprising determining, based on the acquisition context and on the display context, whether the one or more modifications are to be applied to the image, wherein whether the one or more modifications are to be applied is based at least in part on a comparison of the acquisition context to the display context, the comparison comprising a comparison of an operating system, as determined from the acquisition context, of a capturing computer system that captures the screenshot image to an operating system, as determined from the display context, of a display computer system to display the screenshot image with the one or more modifications.

17. The computer system of claim 16, wherein the screenshot image comprises embedded acquisition context data, wherein the method further comprises gathering the acquisition context data by a capturing computer system at a time that the capturing computer system captures the screenshot image and embedding the acquisition context data as metadata of the screenshot image, and wherein the analyzing the screenshot image determines the acquisition context based at least partially on the embedded acquisition context data of the screenshot image.

18. The computer system of claim 16, wherein whether the one or more modifications are to be applied is based at least in part on at least one selected from the group consisting of:
- a comparison of user interface elements of the capturing computer system, as determined from the acquisition context, to user interface elements of the display computer system, as determined from the display context, wherein the likelihood that the one or more modifications are to be applied is directly proportional to a degree of likeness between user interface elements of the capturing computer system and user interface elements of the display computer system;
- a relationship of a user indicated by the acquisition context to a user indicated by the display context; and
- a user request for the one of more visual elements to be modified given the display context.

19. The method of claim 1, wherein at least one modification of the one or more modifications comprises altering at least one visual element of the one or more visual elements.

20. The computer program product of claim 11, wherein at least one modification of the one or more modifications comprises altering at least one visual element of the one or more visual elements.

* * * * *